(12) United States Patent
Takano

(10) Patent No.: US 7,688,910 B2
(45) Date of Patent: Mar. 30, 2010

(54) WIRELESS COMMUNICATION SYSTEM, WIRELESS COMMUNICATION APPARATUS, WIRELESS COMMUNICATION METHOD, AND COMPUTER PROGRAM

(75) Inventor: Hiroaki Takano, Saitama (JP)

(73) Assignee: Sony Corporation, Tokyo (JP)

(*) Notice: Subject to any disclaimer, the term of this patent is extended or adjusted under 35 U.S.C. 154(b) by 847 days.

(21) Appl. No.: 11/333,299

(22) Filed: Jan. 18, 2006

(65) Prior Publication Data

US 2006/0182192 A1 Aug. 17, 2006

(30) Foreign Application Priority Data

Jan. 21, 2005 (JP) ............... 2005-014607

(51) Int. Cl.
*H04B 7/02* (2006.01)
*H04L 1/02* (2006.01)

(52) U.S. Cl. .................. 375/267; 375/260; 375/347

(58) Field of Classification Search ............. 375/134, 375/45, 149, 267, 145, 259–260, 285, 295, 375/316, 354, 358, 365–368, 346–347, 356, 375/219; 370/208, 210; 455/39, 500, 507, 455/517, 522, 93, 114.2–114.3, 422.1, 425, 455/436, 442–443

See application file for complete search history.

(56) References Cited

U.S. PATENT DOCUMENTS

| 5,852,630 | A | * | 12/1998 | Langberg et al. | ............ 375/219 |
| 6,097,773 | A | * | 8/2000 | Carter et al. | ............ 375/347 |
| 2004/0192218 | A1 | * | 9/2004 | Oprea | ............ 455/73 |
| 2004/0252632 | A1 | * | 12/2004 | Bourdoux et al. | ............ 370/210 |

FOREIGN PATENT DOCUMENTS

JP 10-084324 3/1998

* cited by examiner

*Primary Examiner*—Shuwang Liu
*Assistant Examiner*—James M Perez
(74) *Attorney, Agent, or Firm*—Finnegan, Henderson, Farabow, Garrett & Dunner, L.L.P.

(57) ABSTRACT

Disclosed is a wireless communication system which carries out spatial multiplexing communication forming multiple spatial channels between a pair of a transmitter with multiple antennas and a receiver with multiple antennas, having the transmitter and the receiver. In the system, the multiple spatial channels are divided into one or more groups, the transmitter transmits reference signals corresponding to spatial channels in succession in a time-division manner for each group, and the receiver acquires a channel matrix whose column vectors are transfer functions of the spatial channels obtained from the reference signals for each group and spatially demultiplexes a receive signal using a receive weight obtained based on the channel matrix.

10 Claims, 5 Drawing Sheets

WIRELESS COMMUNICATION SYSTEM, WIRELESS COMMUNICATION APPARATUS, WIRELESS COMMUNICATION METHOD, AND COMPUTER PROGRAM

CROSS REFERENCES TO RELATED APPLICATIONS

The present invention contains subject matter related to Japanese Patent Application No. 2005-014607 filed in the Japanese Patent Office on Jan. 21, 2005, the entire contents of which being incorporated herein by reference.

BACKGROUND OF THE INVENTION

1. Field of the Invention

The present invention relates to a wireless communication system, a wireless communication apparatus, a wireless communication method, and a computer program for implementing broadband wireless transmission between a plurality of wireless stations, as typically performed in a wireless LAN (Local Area Network) or PAN (Personal Area Network). In particular, the invention relates to a wireless communication system, a wireless communication apparatus, a wireless communication method, and a computer program that expand transmission capacity by carrying out MIMO (Multi Input Multi Output) communication forming multiple logical channels between a pair of a transmitter with multiple antennas and a receiver with multiple antennas by using spatial multiplexing.

More specifically, the invention relates to a wireless communication system, a wireless communication apparatus, a wireless communication method, and a computer program that carry out MIMO transmission using an enormous number of transmit/receipt antenna pairs to obtain significantly large transmission capacity. In particular, the invention relates to a wireless communication system, a wireless communication apparatus, a wireless communication method, and a computer program that perform spatial multiplexing using a more accurate receive weight obtained by avoiding the effect of transmission channel variations associated with the expansion of an area for channel matrix acquisition, in a large-number MIMO communication system having an enormous number of transmit/receipt antenna pairs.

2. Description of the Related Art

In recent years, there has been conducted active research and development on the wireless LAN or PAN typified by IEEE 802.11 and IEEE 802.15. The IEEE 802.11a standard supports a modulation scheme achieving a communication speed of up to 54 Mbps. However, there is a need for additional standards that can realize a higher bit rate. IEEE 802.11n aims to develop a wireless LAN technology that allows for an effective throughput higher than 100 Mbps and to establish next-generation wireless LAN standards.

As a technology for realizing higher-speed wireless communication, MIMO (Multi-Input Multi-Output) communication is coming to attention. In the MIMO communication scheme, a transmitter distributes transmit data to multiple antennas and transmits it through multiple virtual MIMO channels, and a receiver obtains receive data by processing signals received by multiple antennas. In this manner, the MIMO communication scheme utilizes channel characteristics and differs from a simple transmission/reception adaptive array. The MIMO communication can increase the channel capacity according to the number of antennas without increase of the frequency band and accordingly has higher efficiency of frequency utilization.

FIG. 5 conceptually shows the configuration of a MIMO communication system. As shown in FIG. 5, each of a transmitter and a receiver is equipped with multiple antennas. The transmitter space-time encodes multiple transmit data streams, multiplexes the encoded data, distributes the multiplexed signals to M antennas, and transmits them onto multiple MIMO channels. The receiver receives the multiplexed transmit signals by N antennas through the MIMO channels and space-time decodes the received transmit signals to obtain receive data. In this case, the channel model is composed of a radio environment around the transmitter (transfer function), a channel space structure (transfer function), and a radio environment around the receiver (transfer function). The number of MIMO channels obtained in the MIMO communication system generally matches the number of transmit antennas M or the number of receive antennas N, whichever is smaller, min[M, n].

Before transmitting the multiplexed signals, the transmitter transmits a training signal, e.g., for each antenna in a time-division manner, with which the receiver performs channel estimation. At the other end, the receiver performs channel estimation at a channel estimation unit using the training signal and calculates a channel information matrix H corresponding to the antenna pairs. Based on the inverse matrix $H^{-1}$ of the obtained channel information matrix H, the receiver obtains a receive weight.

After the training of the receive weight, the transmitter space-time encodes multiple transmit data streams, multiplexes the encoded data, distributes the multiplexed signals to M antennas, and transmits them onto multiple MIMO channels. The receiver receives the multiplexed transmit signals by N antennas through the MIMO channels and space-time decodes the received transmit signals to spatially demultiplex the receive data of each MIMO channel. Multiplexed signals transmitted from the antennas involve crosstalk. However, the receiver can correctly extract the spatially multiplexed signals without crosstalk through appropriate signal processing using the receive weight obtained from the inverse matrix $H^{-1}$ of the channel information matrix H, that is, improve the signal-to-noise ratio to enhance the degree of certainty of decoding.

While various schemes of MIMO transmission configuration have been proposed, it is a significant problem in implementation how to exchange channel information between the transmitter and the receiver in accordance with an antenna configuration.

In the case of exchanging channel information, it is easy to implement a method of transmitting known information (preamble information) only from the transmitter to the receiver. In this case, the transmitter and the receiver perform spatial multiplexing transmission independently of each other. This is called an open-loop MIMO transmission scheme. As an extension of the open-loop type, there is a closed-loop MIMO transmission scheme for creating ideal, spatially orthogonal channels between the transmitter and the receiver by feedback of preamble information from the receiver to the transmitter as well.

The open-loop MIMO transmission scheme can include a V-BLAST (Vertical Bell Laboratories Layered Space Time) scheme (e.g., see patent document 1). The transmitter simply multiplexes a signal for each antenna and transmits, without providing an antenna weighting factor matrix. In other words, a feedback procedure for obtaining the antenna weighting factor matrix is all omitted. Before transmitting the multiplexed signals, the transmitter inserts a training signal, e.g., for each antenna in a time-division manner, with which the receiver performs channel estimation. At the other end, the receiver performs channel estimation at a channel estimation unit using the training signal and calculates a channel information matrix H corresponding to the antenna pairs. By combing zero-forcing and canceling neatly, a signal-to-noise ratio is improved by utilizing a degree of freedom of each antenna that is caused by the canceling and the degree of certainty of decoding is enhanced.

As an ideal form of the closed-loop MIMO transmission, there is known an SVD-MIMO scheme using the singular value decomposition (SVD) of a propagation function (e.g., see non-patent document 1). In the SVD-MIMO transmission, $UDV^H$ is obtained by performing the singular value decomposition of a numerical matrix whose elements denote channel information corresponding to respective antenna pairs, namely a channel information matrix H, and a transmit antenna weighting factor matrix V and a receive antenna weighting factor matrix $U^H$ are applied. Thereby, each MIMO channel is expressed as a diagonal matrix D having the diagonal elements represented by the square root of a singular value $\lambda_i$ of the ith spatial channel and a signal can be multiplexed to be transmitted without any crosstalk. In this case, it is possible to realize spatially divided (i.e., spatially orthogonal multiplexed), logically independent, multiple transmission channels at both the transmitter and the receiver. According to the SVD-MIMO transmission scheme, it is possible to achieve maximum channel capacity in theory. For example, if the transmitter and the receiver have two antennas each, it is possible to acquire double the transmission capacity at maximum.

In the case of constructing a wireless network in a room, there is formed a multipath environment in which the receiver receives the superposition of direct waves and multiple reflected waves and delayed waves. Principal countermeasures against the delay distortion can include a multicarrier transmission scheme, typified by OFDM (Orthogonal Frequency Division Multiplexing). For example, IEEE 802.11a/n which is a MIMO-transmission-applied LAN system adopts the OFDM modulation scheme.

As described above, in the MIMO communication system irrespective of the open-loop type or the closed-loop type, the basic operation of the receiver is to acquire a channel matrix H using reference signals transmitted from the transmitter and performs spatial demultiplexing using the inverse matrix $H^{-1}$ of the acquired channel matrix H as the receive weight. In the closed-loop type such as SVD, the transmit antenna weighting factor matrix V is used as a transmit weight at the transmitter. On the other hand, the open-loop type is constructed basically in the same manner as the closed-loop type with the exception of substituting an identity matrix for the transmit antenna weighting factor matrix V.

Consideration will be given to the operation in which the receiver performs training on a receive weight using reference signals transmitted from the transmitter.

FIG. 2 schematically shows an example of the structure of packets transmitted from a MIMO transmitter. In FIG. 2, the MIMO communication system is assumed to have four transmit antennas and four receive antennas, i.e., a 4×4 antenna configuration, and have four reception branches. The reception branches are independent channels corresponding to space streams, namely, MIMO channels.

The transmitter transmits the same synchronization signal through each antenna. Next, the transmitter transmits reference signals with which the receiver performs channel estimation, in a time-division manner from respective transmit antennas. At this time, the reference signals are transmitted in order of a reference signal 1, a reference signal 2, a reference signal 3, and a reference signal 4. Then, the transmitter transmits spatially multiplexed user data of each MIMO channel.

The MIMO receiver uses a receive weight in order to spatially demultiplex receive signals. The receiver performs channel estimation using the reference signals from the antennas, acquires the channel matrix H whose column vectors are channel transfer functions obtained from the reference signals, and obtains the inverse matrix $H^{-1}$ of the channel matrix H. In this manner, the receive weight can be obtained.

However, the state of a transmission channel changes every moment because of a change in a reflected path due to a move of a person or a device. Therefore, in the case of transmitting respective reference signals in a time-division manner as described above, there is a problem that channel estimation is performed on a different transmission channel due to the time difference between transmission and reception.

In the case of a 4×4 MIMO communication system, four reference signals are transmitted in a time-division manner as shown in FIG. 2. For example, in an OFDM-MIMO communication system operating in the 5 GHz band, one reference signal uses two OFDM symbols at most. Since there are four reference signals transmitted in the MIMO communication system having the configuration of 4×4, eight OFDM symbols are used to obtain a channel matrix H. The eight OFDM symbols correspond to approximately 32 µs. Although the channel matrix H changes every moment, it can be considered that there is almost no change within a short time such as 32 µs.

On the other hand, the MIMO communication system can form MIMO channels that correspond to the number of transmit antennas M or the number of receive antennas N, whichever is smaller, min [M, n] (as described above). Accordingly, the MIMO communication system uses spatial multiplexing acquiring more MIMO channels by increasing the number of transmit/receive antenna pairs, thereby making it possible to greatly expand transmission capacity in theory. Hereinafter, such a MIMO communication system is referred to as a "large-number MIMO".

In the large-number MIMO communication system, in the case where the transmitter transmits reference signals in a time-division manner from respective transmit antennas and the receiver performs training of the channel matrix, the transmission/reception time difference between the first reference signal and the last reference signal cannot be neglected and it is difficult to acquire an effective channel matrix due to the effect of transmission channel variations. For example, in the case of a MIMO communication system having the configuration of 100×100, an area for channel matrix acquisition requires as much as 800 µs. For this reason, the receive weight becomes inaccurate and it becomes difficult to perform spatial demultiplexing, so that the MIMO communication system cannot offer its performance.

[Patent document 1] Japanese Patent Application Laid-Open No. 10-84324

[Non-patent document 1] http://radio3.ee.uec.ac.jp/MIMO(IEICE_TS).pdf (as of Oct. 24, 2003)

SUMMARY OF THE INVENTION

It is desirable to provide a wireless communication system, a wireless communication apparatus, a wireless communication method, and a computer program excellent at being able to expand transmission capacity by carrying out MIMO communication forming multiple logical channels by using spatial multiplexing.

Further, it is desirable to provide a wireless communication system, a wireless communication apparatus, a wireless communication method, and a computer program excellent at being able to carry out large-number MIMO transmission using an enormous number of transmit/receipt antenna pairs to obtain significantly large transmission capacity.

Furthermore, it is desirable to provide a wireless communication system, a wireless communication apparatus, a wireless communication method, and a computer program excellent at being able to perform spatial multiplexing using a more accurate receive weight from an effective channel matrix obtained by avoiding the effect of transmission channel variations associated with the expansion of an area for channel matrix acquisition and make full use of the capabilities of MIMO, in a large-number MIMO communication system having an enormous number of transmit/receipt antenna pairs.

Furthermore, it is desirable to provide a wireless communication system, a wireless communication apparatus, a wireless communication method, and a computer program excellent at being able to perform spatial multiplexing using a more accurate receive weight from an effective channel matrix obtained by avoiding the effect of transmission channel variations due to the transmission/reception time difference between reference signals during a channel matrix acquisition period at a MIMO receiver using reference signals transmitted in a time-division manner from a MIMO transmitter and make full use of the capabilities of a large-number MIMO communication system.

According to an embodiment of the present invention, there is provided a wireless communication system which carries out spatial multiplexing communication forming multiple spatial channels between a pair of a transmitter with multiple antennas and a receiver with multiple antennas. In the wireless communication system, the multiple spatial channels are divided into one or more groups, the transmitter transmits reference signals corresponding to spatial channels in succession in a time-division manner for each group, and the receiver acquires a channel matrix whose column vectors are transfer functions of the spatial channels obtained from the reference signals for each group and spatially demultiplexes a receive signal using a receive weight obtained based on the channel matrix.

In this context, the term "system" signifies a logical set of a plurality of apparatuses (or function modules to implement a specific function). It is indefinite whether or not the apparatuses or function modules are contained in a single enclosure (the same applies hereinafter).

The wireless communication system according to the embodiment of the invention is provided with multiple antenna elements at both the transmitter and the receiver and realizes spatially multiplexed MIMO channels, thereby enhancing transmission capacity. Further, the OFDM modulation scheme is applied to the wireless communication system in order to solve the problem of delay distortion in a multipath environment.

The MIMO transmission scheme includes the open-loop MIMO transmission scheme in which the transmitter and the receiver perform spatial multiplexing transmission independently of each other and the closed-loop MIMO transmission scheme in which ideal, spatially orthogonal channels are created between the transmitter and the receiver by feedback of preamble information from the receiver to the transmitter as well. The MIMO communication system forms MIMO channels that correspond to the number of transmit antennas M or the number of receive antennas N, whichever is smaller, min [M, n]. Therefore, it is possible to greatly expand transmission capacity in theory by constructing a large-number MIMO communication system in which the number of transmit/receive antenna pairs is increased.

In the MIMO communication system, the receiver acquires a channel matrix having the elements corresponding to transmit/receive antenna pairs using reference signals transmitted in a time-division manner from transmit antennas and acquires a receive weight from the inverse matrix of the channel matrix. However, since the respective reference signals are transmitted at different times, the communication system is undesirably affected by channel variations.

For example, in a 4×4 OFDM-MIMO communication system operating in the 5 GHz band, it takes approximately 32 μs to acquire the channel matrix H, and it can be considered that there is almost no change within a short time such as 32 μs.

However, in the large-number MIMO communication system, in the case where the transmitter transmits all reference signals from the respective transmit antennas in a time-division manner at the time of starting transmission of user data, the transmission/reception time difference between the first reference signal and the last reference signal cannot be neglected and it is difficult to acquire an effective channel matrix due to the effect of transmission channel variations. For this reason, the receive weight becomes inaccurate and it becomes difficult to perform spatial demultiplexing, so that the MIMO communication system cannot offer its performance.

On the other hand, in the wireless communication system according to the embodiment of the invention, multiple spatial channels are divided into a plurality of groups and the transmitter transmits reference signals in a time-division manner for each group. In other words, transfer functions as to all MIMO channels constituting the MIMO communication system are not obtained in one channel matrix acquisition sequence (that is, a large-size channel matrix is not obtained at a time), instead, the MIMO channels constituting the MIMO communication system are divided into a plurality of groups, and the receiver obtains channel transfer functions for each group to acquire the channel matrix of the whole system in several channel matrix acquisition sequences.

Thereby, the transmission/reception time difference between the first reference signal and the last reference signal in one operation of transmitting reference signals becomes small, thus making it possible to suppress the effect of channel variations during this period.

The receiver acquires a channel matrix whose column vectors are transfer functions of the respective spatial channels obtained from the reference signals for each group. Further, the receiver spatially demultiplexes receive signals with accuracy, using a receive weight obtained based on the channel matrix.

The transmitter starts transmitting user data in succession from the spatial channels of the group whose channel matrix has been acquired by the receiver through transmission of reference signals. At the other end, the receiver can perform reception processing on the received user data using the channel matrix obtained from the reference signals of the group.

The receiver updates the channel matrix as to each group obtained from the reference signals received in a time-division manner, using the received user data. Thereby, it is possible to always keep the channel matrix with accurate values in the process of creating the whole-system channel matrix divided into each group. As a result, it is possible to keep a large-size channel matrix with more accurate values, thereby making full use of the capabilities of the large-number MIMO communication system to secure enormous amount of transmission capacity.

The receiver can perform tracking calculation of the channel matrix using a tracking algorithm such as LMS or RLS based on decision feedback.

According to another embodiment of the present invention, there is provided a computer program described in computer-readable form so as to allow a computer system to execute processing for carrying out spatial multiplexing communication forming multiple spatial channels between a pair of a transmitter with multiple transmit antennas and a receiver with multiple receive antennas. The computer program includes the steps of dividing the multiple spatial channels into one or more groups, transmitting reference signals corresponding to spatial channels in succession in a time-division manner for each group, and spatially multiplexing user data and transmitting the spatially multiplexed user data onto the multiple spatial channels.

Further, according to another embodiment of the present invention, there is provided a computer program described in computer-readable form so as to allow a computer system to execute processing for carrying out spatial multiplexing communication forming multiple spatial channels between a pair of a transmitter with multiple transmit antennas and a receiver with multiple receive antennas. The computer program includes the steps of dividing the multiple spatial channels into one or more groups, receiving reference signals transmitted in a time-division manner for each group from the transmitter, obtaining transfer functions of spatial channels corresponding to the received reference signals and acquiring a channel matrix whose column vectors are the transfer functions of the spatial channels, spatially demultiplexing a receive signal using a receive weight obtained based on the channel matrix, and updating the channel matrix as to each group obtained from the reference signals received in a time-division manner, using the received user data.

The computer program according to the second and third embodiments of the invention is defined as a computer program described in a computer-readable form so as to implement specified processes on a computer system. In other words, when the computer program according to the second and third embodiments of the invention is installed in a computer system, the computer system exhibits cooperative effects and operates as a MIMO transmitter and a MIMO receiver respectively. A plurality of such communication apparatuses can be activated to construct a wireless network. In this manner, it is possible to provide effects similar to those of the wireless communication system according to the first embodiment of the invention.

According to an embodiment of the invention, it is possible to provide a wireless communication system, a wireless communication apparatus, a wireless communication method, and a computer program excellent at being able to carry out MIMO transmission using an enormous number of transmit/receipt antenna pairs to obtain significantly large transmission capacity.

According to another embodiment of the invention, it is possible to provide a wireless communication system, a wireless communication apparatus, a wireless communication method, and a computer program excellent at being able to perform spatial multiplexing using a more accurate receive weight from an effective channel matrix obtained by avoiding the effect of transmission channel variations associated with the expansion of an area for channel matrix acquisition and make full use of the capabilities of MIMO, in a large-number MIMO communication system having an enormous number of transmit/receipt antenna pairs.

According to another embodiment of the invention, it is possible to provide a wireless communication system, a wireless communication apparatus, a wireless communication method, and a computer program excellent at being able to perform spatial multiplexing using a more accurate receive weight from an effective channel matrix obtained by avoiding the effect of transmission channel variations due to the transmission/reception time difference between reference signals during a channel matrix acquisition period at a MIMO receiver using reference signals transmitted in a time-division manner from a MIMO transmitter and make full use of the capabilities of MIMO.

These and other features and advantages of the invention will be apparent from the following more particular description of preferred embodiments of the invention, as illustrated in the accompanying drawings.

BRIEF DESCRIPTION OF THE DRAWINGS

Embodiments of the present invention will be described in detail based on the following figures, wherein.

DESCRIPTION OF THE PREFERRED EMBODIMENTS

Hereinafter, an embodiment of the present invention will be described in detail with reference to the accompanying drawings.

The invention can be applied to a MIMO communication system. In the MIMO communication system, a transmitter and/or a receiver performs antenna synthesis in such a manner that the transmitter with multiple antennas and the receiver with multiple antennas make a pair and form multiple logical channels independent of each other, namely MIMO channels. According to the MIMO communication system, a plurality of RF transmission/reception units are put together in one wireless apparatus, thus realizing large-capacity data transmission. Further, the OFDM modulation scheme is adopted in order to solve the problem of delay distortion in a multipath environment.

Although the invention is applied to a large-number MIMO communication system which uses spatial multiplexing acquiring more MIMO channels by increasing the number of transmit/receive antenna pairs, the invention can also be applied to an ordinary MIMO communication system having relatively fewer antennas.

Figure 1:
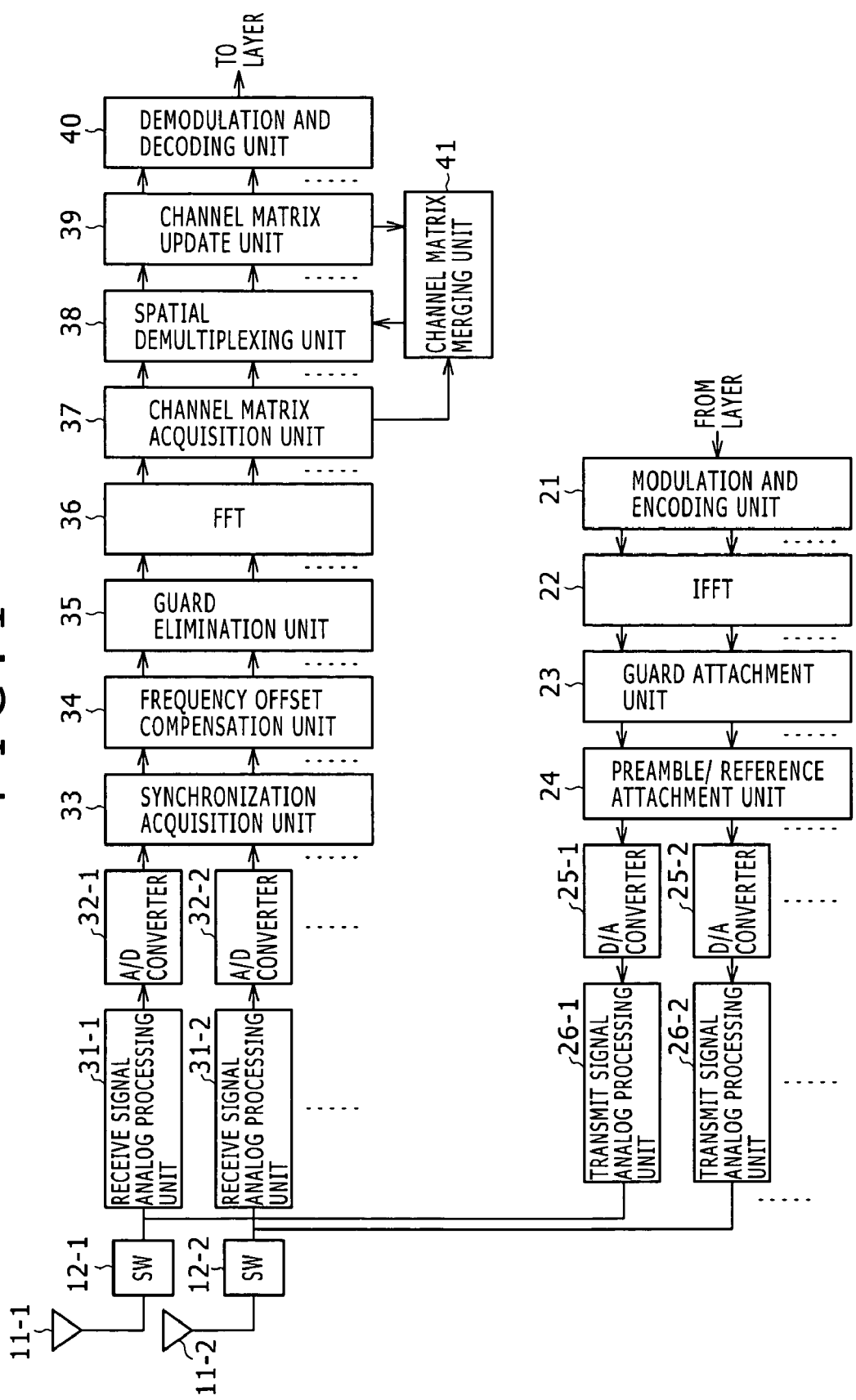
FIG. 1 is a schematic block diagram of a wireless communication apparatus according to an embodiment of the present invention.

FIG. 1 is a schematic block diagram of a wireless communication apparatus according to an embodiment of the present invention. A wireless communication apparatus 100 shown in FIG. 1 can operate as a MIMO communication apparatus having multiple antenna elements at both the transmitter and the receiver. In FIG. 1, only two respective transmission/reception lines are depicted to avoid complication of the drawing. However, in practice, the wireless communication apparatus 100 includes 100 or more transmission/reception lines to be configured as a large-number MIMO transmitter/receiver.

Transmission lines and reception lines are connected in parallel to transmit/receive antennas 11-1 and 11-2 via switches 12-1 and 12-2 for wireless transmission of signals over a predetermined frequency channel to any other wireless communication apparatus or reception of signals transmitted from any other wireless communication apparatus. However, the switches 12-1 and 12-2 connects the transmit/receive antennas 11-1 and 11-2 to either a transmission line or a reception line exclusively at a time and each antenna is unable to perform concurrent transmission and reception.

Each transmission line includes a modulation and encoding unit 21, IFFT22, a guard attachment unit 23, a preamble/reference attachment unit 24, a D/A converter 25 and a transmit signal analog processing unit 26 for each antenna.

The modulation and encoding unit 21 encodes transmit data sent from an upper layer of a communication protocol by error correction coding and map transmit signals in a signal space, using a predetermined modulation scheme such as BPSK, QPSK, and 16 QAM. Here, it is possible to obtain multiple MIMO channels through spatial multiplexing by multiplying encoded transmit signals by a predetermined transmit weight matrix. At this time, a known data string may be inserted as a pilot symbol into a modulated symbol sequence, according to pilot symbol insertion pattern and timing. One pilot signal composed of a known pattern may be inserted for every subcarrier or for every several subcarriers.

The IFFT 22 converts modulated serial signals into parallel constellations of data for parallel subcarriers, according to parallel subcarriers number and timing, and performs Inverse Fast Fourier Transform on the parallel constellations per block of FFT size, according to predetermined FFT size and timing.

The guard attachment unit 23 provides guard intervals before and after one OFDM symbol in order to eliminate interference between symbols. The time width of a guard interval is determined by the state of transmission channels, that is, the maximum delay time of delayed waves which affect demodulation. Further, the guard attachment unit 23 converts the parallel data into serial signals, which are then transformed into time-domain transmit signals, while keeping mutual orthogonality of frequency-domain subcarriers.

The preamble/reference attachment unit 24 adds a preamble signal and a reference signal to the head of a transmit signal including RTS, CTS, and DATA packets.

The transmitter transmits reference signals composed of known patterns from respective antennas in a time-division manner for the purpose of channel matrix training at the packet receiver. However, a large-size channel matrix is not obtained at a time, instead, the MIMO channels of the whole system are divided into a plurality of groups, and the transmitter performs a transmission sequence of reference signals for each group. The receiver receives the reference signals for each group and acquires channel transfer functions. By several channel matrix acquisition sequences, the receiver acquires the channel matrix of the whole system. As a result, in a large-number MIMO communication system, the transmission/reception time difference between the first reference signal and the last reference signal in one sequence becomes small, thereby making it possible to suppress the effect of channel variations during the channel matrix acquisition period. In this embodiment, the preamble/reference attachment unit 24 performs a transmission control procedure for determining an antenna for transmitting a reference signal in order to implement the transmission operation of reference signals in each group.

The D/A converters 25-1 and 25-2 convert the transmit signals for the respective antennas into analog base band signals, which are in turn upconverted to signals in an RF frequency band by the transmit signal analog processing units 26-1 and 26-2. Then, the RF signals are transmitted onto respective MIMO channels from the antennas 11-1 and 11-2.

On the other hand, each reception line includes a receive signal analog processing unit 31 and an A/D converter 32 for each antenna, a synchronization acquisition unit 33, a frequency offset compensation unit 34, a guard interval elimination unit 35, FFT 36, a channel matrix acquisition unit 37, a spatial demultiplexing unit 38, a channel matrix update unit 39, a demodulation and decoding unit 40, and a channel matrix merging unit 41.

According to synchronization timing detected by the synchronization acquisition unit 33, digital baseband signals as serial data are converted into constellations of parallel data (one constellation consists of one OFDM symbol including a guard interval).

The frequency offset compensation unit 34 performs frequency correction on the respective digital baseband signals based on frequency error estimate values.

The guard interval elimination unit 35 eliminates the guard intervals that the transmitter has provided before and after one OFDM symbol in order to eliminate interference between symbols.

By performing Fourier transform on signals per effective symbol length, the FFT 36 transforms time-domain signals into frequency-domain signals to decompose receive signals into subcarrier signals.

The channel matrix acquisition unit 37 creates a channel matrix H for every subcarrier based on the FFT outputs of packet preamble parts. The spatial demultiplexing unit 38 synthesizes the FFT outputs of packet data parts for every subcarrier using the inverse matrix $H^{-1}$ of the obtained channel matrix H to demultiplex into independent multiple MIMO channels.

The transmitter transmits reference signals for training the channel matrix H in a time-division manner from respective transmit antennas. The channel matrix acquisition unit 37 acquires the channel matrix H whose column vectors are transfer functions obtained from the reference signals. The spatial demultiplexing unit 38 obtains the inverse matrix $H^{-1}$ of the acquired channel matrix H and performs MIMO synthesis by using the inverse matrix $H^{-1}$ as a receive weight.

However, a large-size channel matrix is not obtained at a time, instead, the MIMO channels of the whole large-number MIMO communication system are divided into a plurality of groups, and the transmitter performs a transmission sequence of reference signals for each group. The channel matrix acquisition unit 37 obtains channel transfer functions based on the reference signals received in a time-division manner for each group to acquire the channel matrix of the whole system in several channel matrix acquisition sequences. As a result, in the large-number MIMO communication system, the transmission/reception time difference between the first reference signal and the last reference signal in one sequence becomes small, thereby making it possible to suppress the effect of channel variations during the channel matrix acquisition period.

Further, the transmitter starts transmitting user data in succession from the spatial channels of the group whose channel matrix has been acquired by the receiver through the transmission of the reference signals. The spatial demultiplexing unit 38 spatially demultiplexes the received user data using the partial channel matrix obtained from the reference signals of the group.

The channel matrix update unit 39 updates the channel matrix as to each group obtained from the reference signals received in a time-division manner, using the received user data. The channel matrix update unit 39 can perform tracking calculation of the channel matrix using a tracking algorithm such as LMS or RLS based on decision feedback. In this case, the channel matrix update unit 39 measures the difference between spatially demultiplexed data and a mapping point in constellation and operates an LMS algorithm in which an error signal is the measured difference so as to estimate the channel matrix variation with time after receipt of the reference signals and perform compensation.

The channel matrix merging unit 41 merges a channel matrix that the channel matrix acquisition unit 37 acquires from reference signals with a channel matrix that the channel matrix update unit 39 updates during user data reception, thereby making it possible to always keep a large-size channel matrix with more accurate values. The spatial demultiplexing unit 38 performs spatial demultiplexing using such an accurate channel matrix, thereby making full use of the capabilities of the large-number MIMO communication system to secure enormous amount of transmission capacity.

The demodulation and decoding unit 40 demodulates the data from a modulation point in constellation to an original value after phase rotation correction.

In the closed-loop type such as SVD, the transmit antenna weighting factor matrix V is used as a transmit weight at the transmitter. On the other hand, the open-loop type is constructed basically in the same manner as the closed-loop type with the exception of substituting an identity matrix for the transmit antenna weighting factor matrix V. In short, in the MIMO communication system irrespective of the open-loop type or the closed-loop type, the receiver acquires the channel matrix H using the reference signals transmitted from the transmitter and performs spatial demultiplexing using the inverse matrix $H^{-1}$ of the acquired channel matrix H as the receive weight.

Figure 2:
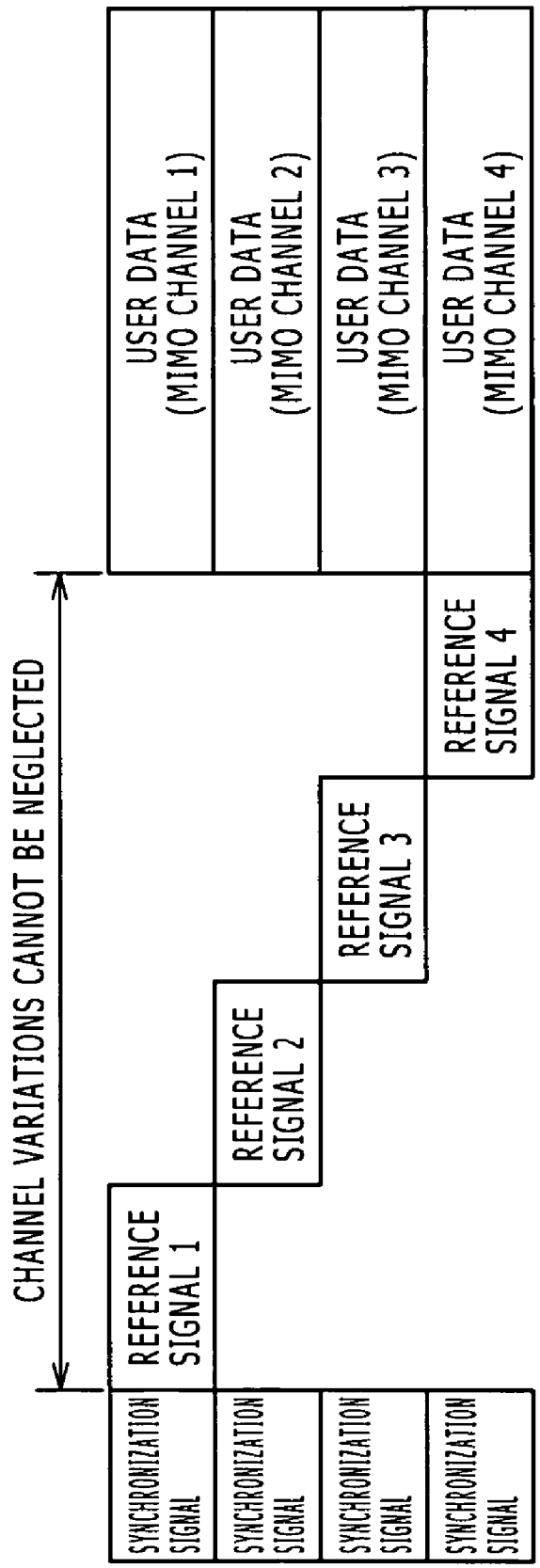
FIG. 2 is an illustration schematically showing an example of a packet structure.

FIG. 2 schematically shows an example of the packet structure in a MIMO communication system. In the example of FIG. 2, the MIMO communication system is assumed to have the configuration of 4×4. Basically, the receiver acquires a channel matrix having the elements corresponding to transmit/receive antenna pairs using reference signals transmitted in a time-division manner from the transmit antennas.

The transmitter transmits the same synchronization signal simultaneously through each transmit antenna. Next, the transmitter transmits reference signals with which the receiver performs channel estimation, in a time-division manner from respective antennas. Then, the transmitter transmits spatially multiplexed user data of each MIMO channel. The receiver performs channel estimation using the reference signals from the antennas so as to be able to calculate the channel matrix H corresponding to each antenna between the transmitter and the receiver.

Since the respective reference signals are transmitted at different times, the communication system is undesirably affected by channel variations.

For example, in an OFDM-MIMO communication system operating in the 5 GHz band, one reference signal uses two OFDM symbols at most. Since there are four reference signals transmitted in the MIMO communication system having the configuration of 4×4, eight OFDM symbols are used to obtain a channel matrix H. The eight OFDM symbols correspond to approximately 32 μs. Although the channel matrix H changes every moment, it can be considered that there is almost no change within a short time such as 32 μs.

However, in the large-number MIMO communication system, in the case where the transmitter transmits reference signals in a time-division manner from respective transmit antennas and the receiver performs training of the channel matrix, the transmission/reception time difference between the first reference signal and the last reference signal cannot be neglected and it is difficult to acquire an effective channel matrix due to the effect of transmission channel variations. For example, in the case of a MIMO communication system having the configuration of 100×100, an area for channel matrix acquisition requires as much as 800 μs. For this reason, the receive weight becomes inaccurate and it becomes difficult to perform spatial demultiplexing, so that the MIMO communication system cannot offer its performance.

On the other hand, in this embodiment, transfer functions as to all MIMO channels constituting the MIMO communication system are not obtained at a time in one channel matrix acquisition sequence (that is, a large-size channel matrix is not obtained at a time), instead, the MIMO channels constituting the MIMO communication system are divided into a plurality of groups, and the transmitter performs a transmission sequence of reference signals for each group, as described above.

In this case, the receiver obtains channel transfer functions for each group to acquire the channel matrix of the whole system in stages in several channel matrix acquisition sequences instead of acquiring the channel matrix of the whole system at a time. That is, the receiver acquires a small-size channel matrix at first so as not to be affected by channel variations. Then, the transmitter transmits reference signals in succession from other transmit antennas while the receiver allows the small-size channel matrix to follow channel variations using a tracking algorithm such as LMS or RLS based on decision feedback. In these stages, the communication system gradually increases the size of the channel matrix.

Figure 3:
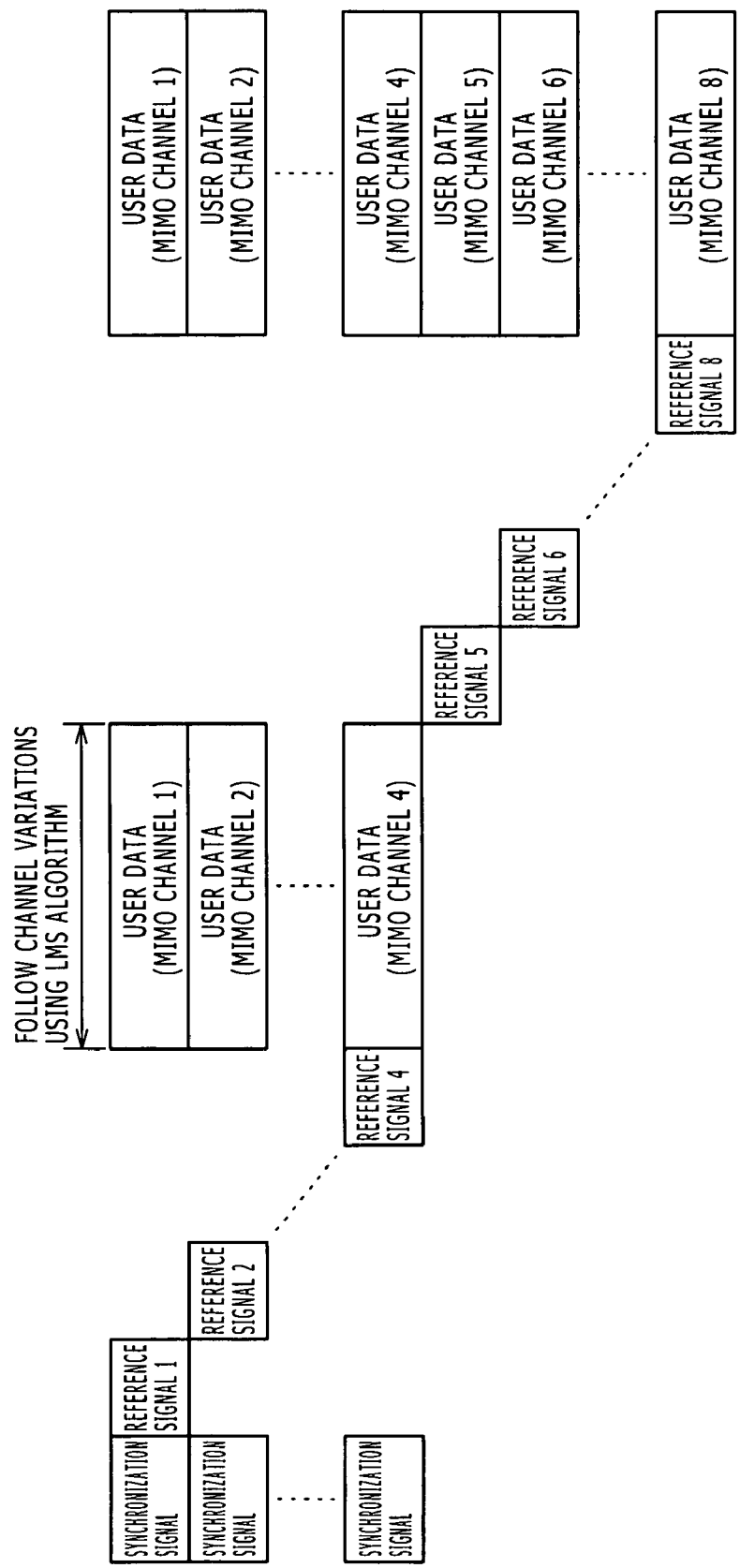
FIG. 3 is an illustration schematically showing an example of a packet structure in the case of performing transmission operation in a large-number MIMO communication system.

FIG. 3 schematically shows an example of the packet structure in the case of performing transmission operation in a large-number MIMO communication system. In the example of FIG. 3, the MIMO communication system is assumed to have the configuration of 8×8 and is divided into two groups each having 4×4 MIMO channels. The receiver acquires one group in one channel matrix acquisition sequence, that is, acquires each 4×4 channel matrix in stages. However, the large-number MIMO communication system may have the transmit/receive antenna configuration of 8×8 or more (for example, 100×100 or more) Further, the size of the channel matrix group acquired in one channel matrix acquisition sequence is not limited to the size of 4×4 as long as the system is not affected by channel variations.

The transmitter transmits the same synchronization signal simultaneously through four antennas of the first group. Next, the transmitter transmits reference signals with which the receiver performs channel estimation, in a time-division manner from the four antennas of the first group. Then, the transmitter starts spatial multiplexing transmission of user data from the four antennas which have already completed transmitting the reference signals.

Subsequently, the transmitter transmits reference signals with which the receiver performs channel estimation, in a time-division manner from the four antennas of the next group. Then, the transmitter performs spatial multiplexing transmission of user data from all the eight antennas which have already completed transmitting the reference signals.

The MIMO communication system having the configuration of 8×8 is exemplified in FIG. 3. However, even if the MIMO communication system has the antenna configuration of 8×8 or more, by dividing the system into groups having the antenna configuration of 4×4, similar data transmission can be performed in the following manner. The transmitter transmits reference signals in each group in a time-division manner. Next, the transmitter starts spatial multiplexing transmission of user data in succession from the antennas that have completed the earliest transmission of reference signals. These operations are repeated, thereby making it possible to implement similar data transmission.

The MIMO receiver which receives packets having such a structure obtains channel transfer functions for each group having the configuration of 4×4 to acquire the channel matrix of the whole system in stages in several channel matrix acquisition sequences instead of obtaining transfer functions as to all MIMO channels constituting the MIMO communication system in one channel matrix acquisition sequence (that is, instead of obtaining a large-size channel matrix at a time). Since the transmission/reception time difference between the first reference signal and the last reference signal in one operation of transmitting reference signals is small, it is possible to suppress the effect of channel variations and obtain a more accurate channel matrix in each group.

While the transmitter starts spatial multiplexing transmission of user data in succession from the antennas that have completed the earliest transmission of reference signals, the receiver updates the acquired channel matrix using received user data, thereby making it possible to always keep a large-size channel matrix with more accurate values.

A description will be given of the operation of the MIMO receiver which receives the packets shown in FIG. 3.

The receiver first acquires a 4×4 channel matrix by the first reference signal transmission in a time-division manner. At this stage, the receiver acquires a partial channel matrix H__1to4 whose elements denote transfer functions of the antenna pairs between transmit antennas 1 to 4 and receive antennas 1 to 8. The channel matrix H__1to4 is expressed as follows:

$$H_{-1to4} = \begin{bmatrix} h_{11} & h_{12} & \cdots & h_{14} \\ h_{21} & \ddots & & \\ \vdots & & \ddots & \\ h_{81} & \cdots & & h_{84} \end{bmatrix} \quad (1)$$

In this case, while the transmitter transmits reference signals from the transmit antennas 1 to 4, the receiver receives these signals with all the receive antennas 1 to 8.

The receiver obtains the inverse matrix of the channel matrix H__1to4 and uses the inverse matrix as a weight for spatially demultiplexing the spatially multiplexed receive data into four different data streams. Subsequently, the transmitter performs spatial multiplexing transmission of four kinds of user data corresponding to spatial channels 1 to 4 from the transmit antennas 1 to 4 which have completed transmitting the reference signals. Then, the receiver can spatially demultiplex the user data using the inverse matrix H__1to4$^{-1}$ calculated from the channel matrix H__1to4.

Further, the receiver measures the difference between the spatially demultiplexed data and a mapping point in constellation and operates an LMS algorithm in which an error signal is the measured difference.

The LMS algorithm is common in this industry as a parameter estimation algorithm, and is expressed in the following equation (2). In the equation (2), the estimate value of transmit data $X_t$ is determined by decision feedback. It is estimated from a mapping point in constellation that is closest to a decoded signal.

$$\hat{H}_{t+1} = \hat{H}_t + 2\mu(Y_t - \hat{H}_t^{-1}\hat{X}_t)\hat{H}_t^H \quad (2)$$

$\hat{H}_t$: estimate value of channel matrix
$\hat{H}_t^{-1}$: inverse matrix of estimated channel matrix
$X_t$: estimate value of transmit data
$Y_t$: receive data
Small H
$\mu$: cons tan t In this manner, the receiver estimates the channel matrix variation with time after receipt of the reference signals and performs compensation. When the channel matrix H__1to4 becomes almost the same as the variation of transmission channels by the LMS algorithm, the transmitter transmits additional reference signals (corresponding to the next 4×4 group).

This time, the transmitter transmits reference signals from the remaining transmit antennas 5 to 8 in a time-division manner, and the receiver acquires new transfer functions of the antenna pairs between the transmit antennas 5 to 8 and the receive antennas 1 to 8. Further, a channel matrix H__1to8 of the whole MIMO communication system is created by adding the newly acquired transfer function to the previously acquired channel matrix H__1to4. The channel matrix H__1to8 is expressed as follows:

$$H_{-1to8} = \begin{bmatrix} & & h_{15} & h_{16} & \cdots & h_{18} \\ & & h_{25} & \ddots & & \\ H_{-1to4} & & \vdots & & \ddots & \\ & & h_{85} & \cdots & & h_{88} \end{bmatrix} \quad (3)$$

It is possible to spatially demultiplex the spatially multiplexed receive data into eight different data streams by using the channel matrix H__1to8 as a weight for spatially demultiplexing the receive data.

Figure 4:
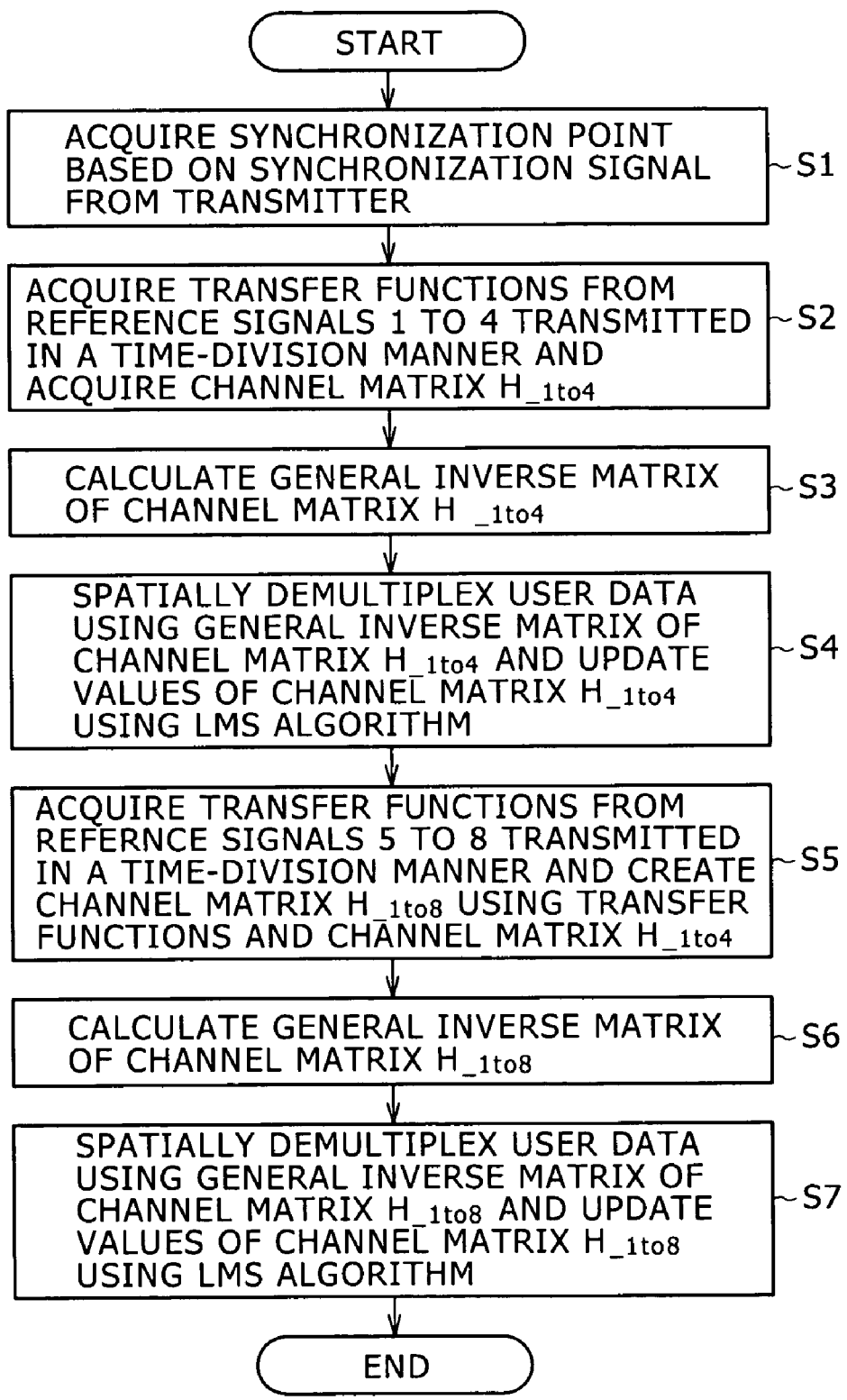
FIG. 4 is an illustration showing the reception processing performed by a MIMO receiver that has received packets having the structure shown in FIG. 3.
Figure 5:
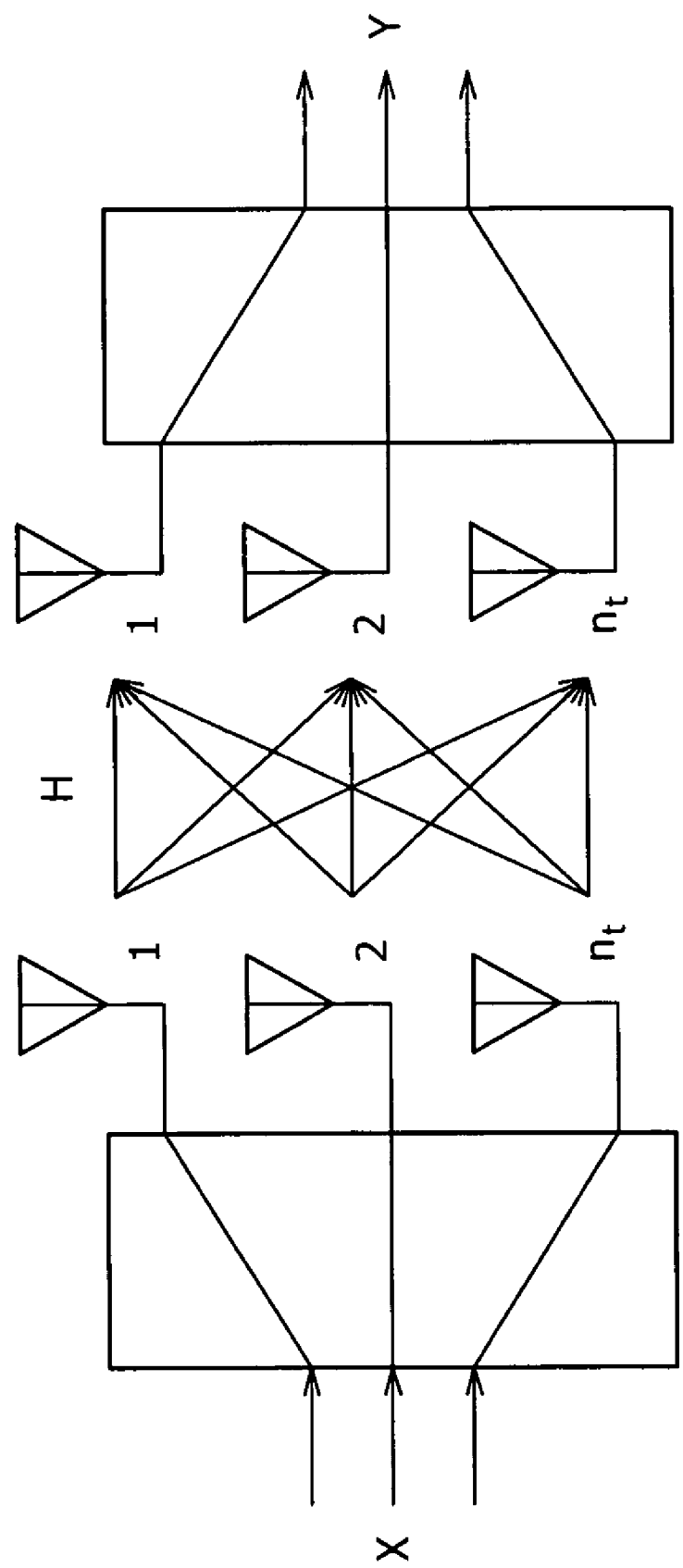
FIG. 5 is an illustration conceptually showing the configuration of a MIMO communication system.

FIG. 4 shows the reception processing performed by the MIMO receiver that has received packets having the structure shown in FIG. 3 in the large-number MIMO communication system.

The transmitter transmits a synchronization signal through the transmit antennas 1 to 4. The receiver first acquires a synchronization point (step S1).

Next, the transmitter transmits the reference signals 1 to 4 in a time-division manner through the transmit antennas 1 to 4. The receiver receives the reference signals 1 to 4 through the receive antennas 1 to 4 and acquires the transfer functions, and the channel matrix acquisition unit 37 acquires the channel matrix H__1to4 (step S2).

Further, the spatial demultiplexing unit 38 in the receiver calculates the general inverse matrix of the channel matrix H__1to4 (step S3).

Next, the transmitter transmits user data corresponding to the spatial channels 1 to 4. The spatial demultiplexing unit 38 in the receiver spatially demultiplexes the user data using the general inverse matrix of the channel matrix H__1to4 obtained at step S3 (step S4). In parallel with this, the channel matrix update unit 39 updates the values of the channel matrix H__1to4, applying the LMS algorithm to the decision feedback.

Next, the transmitter transmits the reference signals 5 to 8 in a time-division manner through the transmit antennas 5 to 8. The receiver receives the reference signals 5 to 8 through the receive antennas 5 to 8. Based on the thereby obtained transfer functions and the updated channel matrix H__1to4, the channel matrix acquisition unit 37 creates the new channel matrix H__$_{1\infty8}$ including the elements of the additional transfer functions (step S5).

Further, the spatial demultiplexing unit 38 in the receiver calculates the inverse matrix of the newly created channel matrix H__$_{1\infty8}$ (step S6).

Next, the transmitter transmits user data corresponding to the spatial channels 1 to 8. The spatial demultiplexing unit 38 in the receiver spatially demultiplexes the user data using the general inverse matrix of the channel matrix H__$_{1\infty8}$. In parallel with this, the channel matrix update unit 39 updates the values of the channel matrix H__$_{1\infty8}$, applying the LMS algorithm to the decision feedback (step S7).

The present invention has been described in detail with reference to the specific embodiment. However, it is obvious that those skilled in the art can make modifications and/or substitutions of the embodiment without departing from the scope and sprit of the invention.

The invention can be applied to a MIMO communication system, and in particular, suitably to a receiver in a MIMO communication system of the multicarrier type. Further, the invention is applicable regardless of the open-loop type such as V-BLAST or the closed-loop type such as SVD-MIMO.

Although the invention is applied to a large-number MIMO communication system which uses spatial multiplexing acquiring more MIMO channels by increasing the number of transmit/receive antenna pairs, the invention can also be applied to an ordinary MIMO communication system having relatively fewer antennas.

That is, the embodiment has been described for illustrative purpose only, and the contents of the specification should not be interpreted restrictively. To understand the scope and sprit of the invention, the appended claims should be taken into consideration.

What is claimed is:

1. A wireless communication system for carrying out spatial multiplexing communication over spatial channels, the wireless communication system comprising:
    a transmitter having antennas; and
    a receiver having antennas; wherein
    the spatial channels are divided into groups including a first group of at least two spatial channels and a second group of at least two spatial channels,
    the transmitter transmits reference signals and user data over the spatial channels,
    the reference signals being transmitted in a time-division manner and in succession over spatial channels of the first group and spatial channels of the second group, and
    the receiver:
        receives the reference signals in the successive order;
        acquires a first partial channel matrix including a first matrix corresponding to the first group;
        spatially demultiplexes the user data using the first partial channel matrix;
        acquires a second partial channel matrix including a second matrix corresponding to the second group, wherein the first matrix and the second matrix are acquired as the reference signals are received over spatial channels of the first group and over spatial channels of the second group;
        generates a channel matrix based on the first partial channel matrix and the second partial channel matrix; and
        spatially demultiplexes the user data using the generated channel matrix.

2. The wireless communication system according to claim 1, wherein
    the transmitter transmits user data in succession over spatial channels of the groups when the channel matrix has been acquired by the receiver from the reference signals, and
    the receiver performs reception processing on the received user data using the channel matrix.

3. The wireless communication system according to claim 2, wherein the receiver successively updates the channel matrix as the user data is successively received and as the reference signals are successively received in a time-division manner and over spatial channels of the groups.

4. The wireless communication system according to claim 3, wherein the receiver performs tracking calculation of the channel matrix using a tracking algorithm based on decision feedback.

5. A wireless communication apparatus comprising:
    antennas for carrying out spatial multiplexing communication over spatial channels with a transmitter having antennas;
    a device configured to divide the spatial channels into groups including a first group of at least two spatial channels and a second group of at least two spatial channels;
    a device configured to receive reference signals and user data transmitted over the spatial channels, the reference signals being received, from the transmitter, in a time-division manner and in succession over spatial channels of the first group and spatial channels of the second group;
    a channel matrix acquisition device configured to:
        acquire a first partial channel matrix including a first matrix corresponding to the first group;
        acquire a second partial channel matrix including a second matrix corresponding to the second group, wherein the first matrix and the second matrix are acquired as the reference signals are received over spatial channels of the first group and over spatial channels of the second group;
        generate a channel matrix based on the first partial channel matrix and the second partial channel matrix; and
    a spatial demultiplexing device configured to spatially demultiplex the user data, after acquiring the first partial channel matrix, based on the first partial channel matrix, wherein the spatial demultiplexing device is further configured to spatially demultiplex the user data, after acquiring the channel matrix, using the generated channel matrix.

6. The wireless communication apparatus according to claim 5, wherein
    the transmitter transmits user data in succession over spatial channels of the groups when the channel matrix has been acquired by the receiver from the reference signals, and
    the spatial demultiplexing device successively and spatially demultiplexes the received user data using the received weight.

7. The wireless communication apparatus according to claim 6, further comprising a channel matrix tracking device configured to successively update the channel matrix as the user data is successively received and as the reference signals are successively received in a time-division manner and over spatial channels of the groups.

8. The wireless communication apparatus according to claim 7, wherein the channel matrix tracking device performs tracking calculation of the channel matrix using a tracking algorithm based on decision feedback.

9. A wireless communication method for carrying out spatial multiplexing communication over spatial channels and between a transmitter having antennas and a receiver having antennas, the wireless communication method being executed by a receiver, the method comprising:

dividing, by using a device in the receiver, the spatial channels into groups including a first group of at least two spatial channels and a second group of at least two spatial channels;

receiving, by using the antennas of the receiver, reference signals and user data transmitted over the spatial channels in a time-division manner and in succession over spatial channels of the first group and spatial channels of the second group;

acquiring a first partial channel matrix including a first matrix corresponding to the first group;

spatially demultiplexing the user data using the first partial channel matrix;

acquiring a second partial channel matrix including a second matrix corresponding to the second group, wherein the first matrix and the second matrix are acquired as the reference signals are received over spatial channels of the first group and over spatial channels of the second group;

generating a channel matrix based on the first partial channel matrix and the second partial channel matrix; and spatially demultiplexing the user data using the generated channel matrix.

10. A non-transitory computer-readable storage medium storing a program, which when executed on a processor, causes the processor to perform a wireless communication method of carrying out spatial multiplexing communication over spatial channels and between a transmitter having antennas and a receiver having antennas, the wireless communication method comprising:

dividing the spatial channels into groups including a first group of at least two spatial channels and a second group of at least two spatial channels;

receiving reference signals and user data transmitted over the spatial channels in a time-division manner and in succession over spatial channels of the first group and spatial channels of the second group;

acquiring a first partial channel matrix including a first matrix corresponding to the first group;

spatially demultiplexing the user data using the first partial channel matrix;

acquiring a second partial channel matrix including a second matrix corresponding to the second group, wherein the first matrix and the second matrix are acquired as the reference signals are received over spatial channels of the first group and over spatial channels of the second group;

generating a channel matrix based on the first partial channel matrix and the second partial channel matrix; and spatially demultiplexing the user data using the generated channel matrix.

* * * * *